(12) United States Patent  
Candelore

(10) Patent No.: US 8,824,685 B2  
(45) Date of Patent: Sep. 2, 2014

(54) METHOD FOR DETECTION OF A HACKED DECODER

(75) Inventor: Brant L. Candelore, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1510 days.

(21) Appl. No.: 12/195,660

(22) Filed: Aug. 21, 2008

(65) Prior Publication Data

US 2009/0097659 A1    Apr. 16, 2009

Related U.S. Application Data

(60) Provisional application No. 60/999,137, filed on Oct. 15, 2007, provisional application No. 61/126,123, filed on May 1, 2008.

(51) Int. Cl.
| | |
|---|---|
| H04L 9/08 | (2006.01) |
| H04N 21/266 | (2011.01) |
| H04N 21/442 | (2011.01) |
| H04N 7/167 | (2011.01) |
| H04N 21/426 | (2011.01) |

(52) U.S. Cl.
CPC ........ *H04L 9/0833* (2013.01); *H04N 21/26613* (2013.01); *H04N 21/26606* (2013.01); *H04N 21/44236* (2013.01); *H04N 7/1675* (2013.01); *H04L 2209/603* (2013.01); *H04N 21/42623* (2013.01)
USPC ............ 380/278; 380/277; 726/2; 726/22; 726/23; 726/26; 726/27

(58) Field of Classification Search
CPC ........... H04L 2209/603; H04L 9/0833; H04N 21/42623; H04N 21/26613; H04N 7/1675; H04N 21/44236; H04N 21/26606
USPC ............... 380/277–278; 726/2, 22–23, 26–27
See application file for complete search history.

(56) References Cited

U.S. PATENT DOCUMENTS

| 4,531,020 A | 7/1985 | Wechselberger et al. | |
| 6,128,391 A * | 10/2000 | Denno et al. | 380/283 |

(Continued)

OTHER PUBLICATIONS

"Revocation and Tracing Schemes for Stateless Receivers," Naor et al., Jul. 2002.

(Continued)

*Primary Examiner* — Saleh Najjar  
*Assistant Examiner* — Peiliang Pan  
(74) *Attorney, Agent, or Firm* — Miller Patent Services; Jerry A. Miller

(57) ABSTRACT

A method of identifying a receiver device from which pirated video decryption keys have been obtained consistent with certain embodiments involves organizing a population of receiver devices into a plurality of N groups; associating the N groups with a plurality of N decryption keys, where each of the N groups is associated with one of the N decryption keys, where the N decryption keys are used for either decryption of content or decryption of other decryption keys; causing the plurality of N decryption keys to be obtained by their associated N groups of receiver devices by direct delivery or by derivation at the receiver devices; and identifying a pirated key as being associated with one of the N groups so as to identify the receiver device from which the pirated video decryption keys have been obtained as belonging to one of the N groups. This abstract is not to be considered limiting, since other embodiments may deviate from the features described in this abstract.

30 Claims, 7 Drawing Sheets

(56) References Cited

U.S. PATENT DOCUMENTS

| | | | |
|---|---|---|---|
| 6,760,445 B1* | 7/2004 | Schwenk et al. | 380/278 |
| 7,010,125 B2* | 3/2006 | Lotspiech et al. | 380/242 |
| 7,039,803 B2* | 5/2006 | Lotspiech et al. | 713/163 |
| 7,233,669 B2 | 6/2007 | Candelore | |
| 2002/0126847 A1 | 9/2002 | Wajs et al. | |
| 2003/0152234 A1* | 8/2003 | Matsushita | 380/277 |
| 2003/0210791 A1 | 11/2003 | Binder | |
| 2004/0194124 A1 | 9/2004 | Medvinsky | |
| 2005/0157878 A1* | 7/2005 | Matsushita | 380/239 |
| 2006/0107285 A1* | 5/2006 | Medvinsky | 725/25 |
| 2008/0263367 A1* | 10/2008 | Tatebayashi et al. | 713/193 |
| 2008/0279376 A1* | 11/2008 | Jin et al. | 380/202 |
| 2009/0214031 A1* | 8/2009 | Jin et al. | 380/200 |

OTHER PUBLICATIONS

International Search Report and Written Opinion of the International Searching Authority, PCT/US08/75672, Nov. 18, 2008.

* cited by examiner

# METHOD FOR DETECTION OF A HACKED DECODER

CROSS REFERENCE TO RELATED DOCUMENTS

This application claims priority benefit of U.S. provisional patent application No. 60/999,137, filed Oct. 15, 2007 and U.S. provisional patent application 61/126,123, filed May 1, 2008 each of which is hereby incorporated by reference. This application is also related to U.S. Pat. No. 7,151,831 "Partial Encryption and PID Mapping" to Candelore et al., U.S. Application No. 20050192904 "Selective Encryption with Coverage Encryption" to Candelore, U.S. Application No. 20040181666 "IP Delivery of Secure Digital Content" to Candelore, which are hereby incorporated by reference.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

A certain U.S. satellite service provider is currently experiencing a revenue loss of millions of dollars every year due to piracy. Content is being received by those who have not paid. Pirates are able to import and reprogram "free-to-air" (FTA) satellite receivers to steal signal from that service provider. The receivers are difficult to shut down because these hacked receivers do not use a cloned identity (public ID plus secret device keys). Rather, the pirates deliver the common periodic keys from an off-shore website to the FTA receivers which have the necessary descrambling, DVB Common Scrambling Algorithm (CSA), in order to access the content. It is therefore difficult for the satellite provider to discover the receiver that has been hacked to leak the periodic keys (also known as a service key, monthly key or subscription key).

Device keys are usually held by a crypto-processor in the receiver and are maintained secret in order to enable the secure delivery of the common periodic keys used to decrypt content. Once an identity (public ID plus secret device keys) is compromised by a hacker, the hacker may use it to make cloned receivers. A cloned receiver will receive the periodic keys automatically by the content delivery system using the identity of the hacked device. But, if a cloned receiver is acquired by law enforcement or the service provider, then it can be analyzed and the cloned identity can be determined and shut-down by de-authorizing the public ID. The public ID will no longer receive periodic key updates, and this can cost the pirates a great of money by invalidating their reverse engineering investment in extracting the identity.

Hackers have developed an approach in which only the common periodic keys, common program keys or the common content keys are delivered to users of the pirated content. This method of piracy is known as the "Wizard" or "McCormack" hack. This safeguards the compromised identity from possible exposure. At this time, the common periodic, program (if used) and content keys are sent to a large number of receivers and consequently cannot be used for forensic purposes to discover which identity was compromised.

BRIEF DESCRIPTION OF THE DRAWINGS

Certain example embodiments illustrating organization and method of operation, together with objects and advantages may be best understood by reference detailed description that follows taken in conjunction with the accompanying drawings in which.

DETAILED DESCRIPTION

Figure 1:
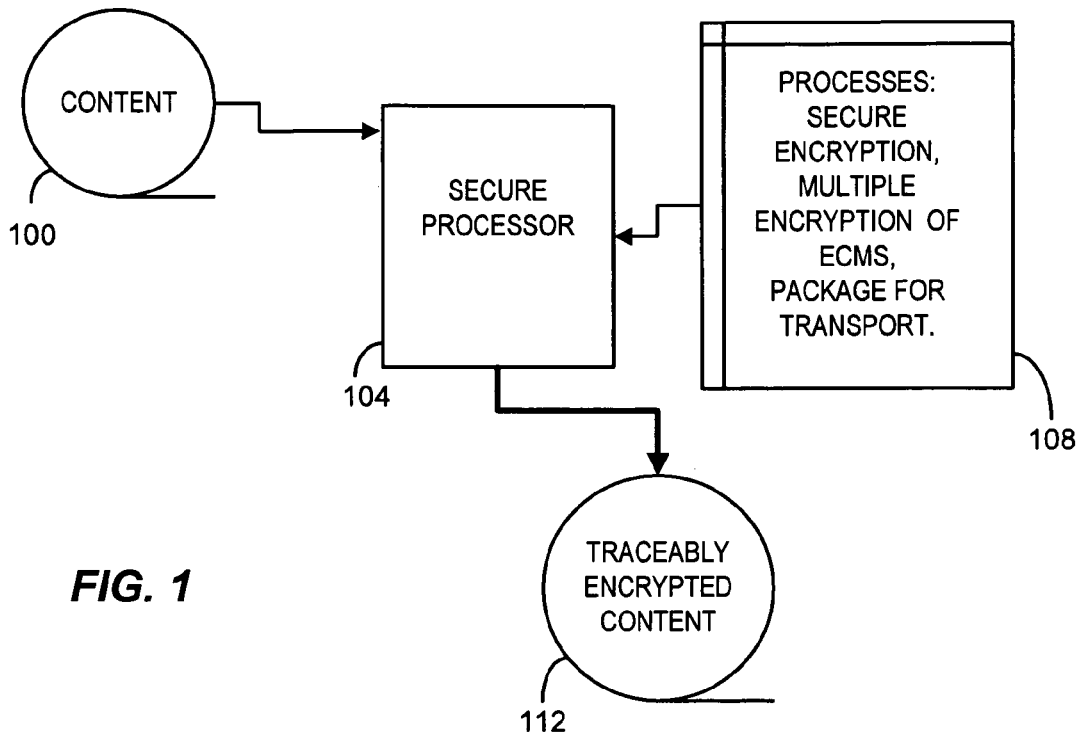
FIG. 1 is a diagram of an example secure encryption system arrangement consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system. In certain situations, "program" also means content such as a movie or TV series.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Certain embodiments may be implemented using one or more programmed processors executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies) and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

Content may be embodied as any or all audio, video, multimedia or interactive data for entertainment, training, artistic, textual, or experimental subject matter that is created for live or non-real time broadcast or multicast streams, Internet streams or downloads, handheld receivers, computer storage media or any other suitable playable modes for which a periodic key update is required.

In order to address the issues noted above, the systems and methods consistent with certain implementations use multiple-encryption of content to deliver a large number of operable and traceable periodic keys to receivers. The periodic keys are used to derive or decrypt content keys delivered using Entitlement Control Messages (ECMs). In some implementations, the periodic keys may be used to deliver intermediate keys called a "channel keys" or "program keys" which are valid for the duration of a particular movie, news program or TV series. In that scenario, a second ECM may be used to deliver values or keys which may then be used to calculate or derive the content keys. The content keys can be applied to each portion of the content that is encrypted using one of the different content keys. A particular periodic, program, or content key can be assigned to a group of receivers or even to an individual receiver. If the periodic, program or content key is compromised and used to create a pirate receiver, then that publicly disseminated key may be used to expose the receivers or group of receivers from which the compromised periodic, program or content key was acquired.

In the discussion below we will use the term "decryption key" as being synonymous with all three of the keys—periodic, program and content—as these are all needed to properly decrypt content. If the decryption key is associated with a small group of receivers, the group can be further broken down in subsequent deliveries of the decryption keys. Different decryption keys can be sent or caused to be derived or decrypted in ever smaller groupings or even to an individual receiver in order to narrow down the search for the source of the compromised key. As the decryption keys are made public, e.g. delivered to hacked receivers, it will thereby be possible to trace the hacked receiver. If the identity of the receiver from which the compromised keys were derived can be forensically determined, then it can be subsequently de-authorized stopping the flow of decryption keys.

It is anticipated that the hackers will continue to deliver decryption key updates to the hacked receivers from an Internet connection. In the past, phone lines and even the U.S. mail were used. The hackers may deploy security for their decryption key updates. For instance, the key updates may be encrypted using SSL or some other authentication and encryption scheme. It may become necessary to test the acquired receivers to see what decryption keys were actually downloaded to the acquired receiver. It can be determined which decryption key is being used by delivering an ECM that uses or derives a particular decryption key one at a time. When the receiver decrypts content, then the ECM and related decryption key can be determined. If the exposed decryption key points to a single receiver, the receiver can then be shut down. If the exposed decryption key points to a particular group, further investigation can be performed to narrow down the member of the group responsible for the released periodic key until the point of dissemination is discovered, which may be one or more devices that need to be shut down to solve the pirating issue.

It would be useful to forensically know what receiver or playback device leaked a decryption key that was made public in order to deauthorize it and curtail the number of clandestine receivers that may be outright cloned or sharing the decryption key.

With the current delivery system for the periodic keys, also known as monthly keys when delivered on a monthly basis, it is impractical to attempt to make every set of periodic key codes unique. At this writing, unique EMMs typically deliver common periodic keys. Each periodic key typically would require its own ECM to calculate or derive the program key (if used) or the content key. A unique periodic key would be the best result from a forensic standpoint, but it is impractical when the service provider is responsible for delivering potentially millions of periodic codes to customers. The number of unique ECMs required would then be equally great. A large amount of bandwidth would be dedicated to just delivering the ECMs.

Another potential issue is the encryption of the content itself. With a single encryption applied to the content, a hacker must simply locate one content encryption key to decrypt and enjoy the received content in its entirety. Service providers are aware of this vulnerability, and typically use multiple encryption keys. Content segments are typically 10 seconds in duration. Redistribution of content keys requires hackers to have an on-going live connection with the pirate website. Segments must be of a long enough duration that if the key were missing, and the segment could not be decrypted, then the content would be significantly degraded. In other words, with missing content, the enjoyment that hackers would receive from watching the content would be negatively affected. However, the longer the period, the more time the hackers have to redistribute the content key. And the key for the next key epoch, delivered using ECMs, must be sent sufficient ahead of time by the service provider for proper processing in order to avoid legitimate receivers from going dark. In some cases, the ECM is sent multiple times to overcome possible noise and the possibility that one of the ECMs has been dropped. Consequently, there is an additional amount of processing overhead that must be dealt with when content is encrypted using multiple encryption keys.

A system for content delivery that provides some forensic information that may be used to identify compromised devices and codes would be useful to broadcasters of original content.

Before proceeding with a more detailed description, it is useful to provide a glossary of encryption terms used herein for reference as follows:

Periodic Key—sometimes called a monthly key, service key or subscription key. The periodic key is generally sent to users via an Entitlement Management Message (EMM) to any one or multiple receivers. EMMs can be unit addressed (encrypted under unique device keys) or group addressed (typically to units with addressed in a range, where encryption is under a type of group key). The periodic key is used to decrypt an Entitlement Control Message (ECM). As the name implies, the periodic key typically changes on a periodic basis according to a subscriber's subscription duration, usually a month, in order to guarantee timely payment. It can be changed more frequently if desired or to enhance security for special events, e.g. pay-per-view programming or video-on-demand (VOD). And there can be more than one periodic key in use at one time. In some cases, service providers may deliver a unique periodic key to subscribers based on service tier or receiver type.

Program Key—sometimes called a channel key. In some conditional access systems, this is an intermediate key in between the periodic key and the content key. It is good for the duration of a program or show, e.g., a Seinfeld episode. It is delivered or derived using an ECM encrypted using a periodic key.

Content Key—sometimes called a Shared Content Key—this key is used at the receiver to decrypt audio/video (A/V) content) for decoding and display to the user. Commonly, this key changes every few seconds (e.g., every 10 seconds or so) to provide enhanced security to the content. The content key is calculated or derived by receivers when processing an ECM. It is possible that content can be selectively multiple encrypted whereby critical content can be duplicated and encrypted multiple ways. This allows unique content keys to be applied simultaneously. These content keys can have forensic qualities.

Decryption Key—This term is generic for the periodic key, program key or content key, since these are required for proper decryption of an encrypted content.

Initialization Vector—This is typically a random number that is transmitted to the receiver within an ECM to initialize the ECM decryption processing for deriving or decrypting the program key or the content key using the periodic key.

Public ID—This is a unique public identifier such as a serial number or unit address that is assigned to the security or crypto processor at manufacture or configuration for each receiver device in the system. It is part of a receiver's identity. The other part of the receiver's identity being the Device Keys. The receiver may have some other box level serial number. But, for these discussions, the Public ID is the address to which an EMM is delivered.

Device Keys—these are secret keys, associated with the Public ID, used to decrypt an EMM addressed to that Public ID.

Access Criterion—This information defines what type of keys and entitlements are required to receive content. The access criteria may be encrypted under the periodic key, or may be hashed or otherwise processed along with the content key for better security. The access criterion may be tightly coupled to the content key so that some combination of the access criterion and the content key has to be decrypted properly by the periodic key in order to successfully decrypt and decode content.

Turning now to FIG. 1, consistent with certain embodiments of the invention this figure presents an exemplary view of one possible system configuration. In this example configuration, content 100 that is to be encrypted to provide security against unauthorized downloading or copying is transmitted to a secure processor 104. Once the content has been received by the secure programmed processor 104, a suite of instruction modules 108 are instantiated to perform the actions used to determine how the content 100 is to be encrypted. In addition, Entitlement Control Messages (ECMs) that provide the delivery mechanism for content keys are encrypted using one or more periodic keys. The content keys are calculated or derived from the ECM data and are applied to encrypt the content. The content keys may be the result of a hash of the entire ECM access criterion and may include information from other ECMs if those other ECMs will result in the same content key (as discussed later with FIG. 5). The number and type of encryption keys are selected, the content 100 is encrypted, and the traceably encrypted content 112 is encoded for transport. The transmission of the content, EMMs, ECMs, and other information is accomplished through any communication channel such as satellite, cable, telephone, Internet or other transmission methods.

In implementations consistent with the present invention, the population of receivers can be divided into groups with each group having associated decryption keys that are specific to that group. When a receiver is compromised, this fact can often be detected by the presence of decryption keys being distributed over the Internet. Once this is determined, analysis of the key will identify a group containing the receiver that was used to hack the encryption keys. By iteratively searching for that receiver using the techniques described below, the receiver can be identified. This can lead law enforcement to the offender or can be used to permit the service provider to inactivate the device used in the hacking operation.

Figure 2:
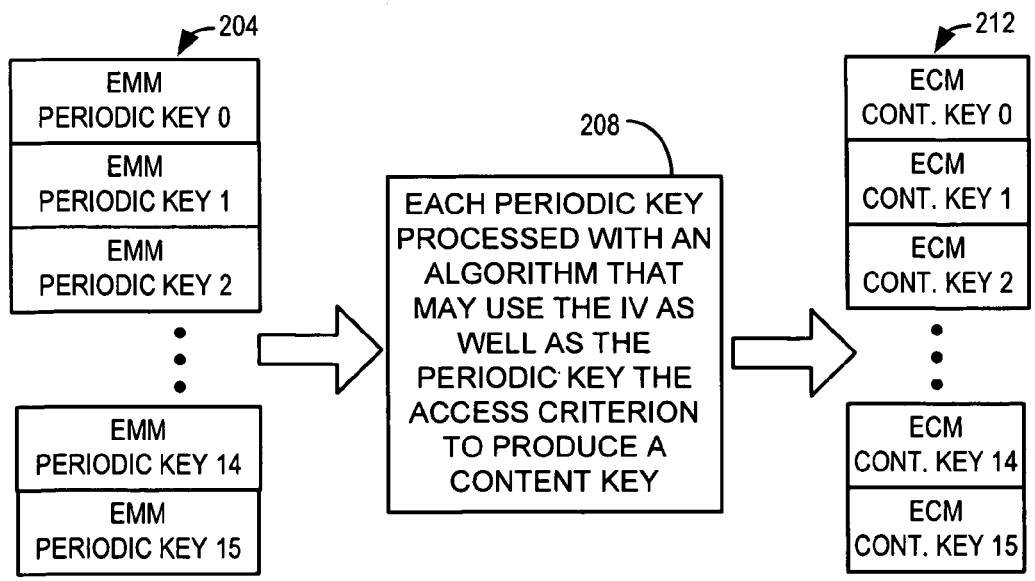
FIG. 2 depicts an example content key creation arrangement consistent with certain example implementations consistent with the present invention.

Referring now to FIG. 2, the content key creation arrangement is for content keys 212 is depicted. In this first implementation, instead of using a single periodic key, multiple periodic keys 204 can be generated with each periodic key being associated with one or more target receiver devices. In this example, 16 such periodic keys are depicted which can be delivered in with EMM messages, with each EMM (and thus each periodic key) being delivered to a target group of receivers. Each periodic key is processed with an algorithm that may use the initial value as well as the periodic key an the access criterion to produce content keys shown as 212.

Each receiver has an ID that uniquely identifies the receiver and can be used in certain implementations as a basis for creating groups of receivers (other techniques for groupings are also possible.). There may be many thousands of such receivers, but each has a unique ID. The data stream transmitted by broadcast to the various receivers includes an entitlement management message (EMM) 204 that carries out various functions associated with conditional access. In this example implementation, a single ECM can be used by multiple periodic keys (e.g., 0-15) for a period of time to entitle the receiver to operate. In this example, each of the periodic keys (0-15) are held by different receivers or receiver groups. By decrypting an IV and hashing the fields of this ECM, a corresponding collection of content keys (e.g., 0-15) will be derived which have a one-to-one correspondence with the periodic key used. A receiver may no longer receive one or more periodic keys as is currently the case. A receiver may receive a much larger number of periodic keys that may be used at different times in the decryption of content. The number of periodic keys in use by a receiver may affect how quickly a hacked receiver can be identified. The more keys used, the more quickly a determination can be made. These periodic keys can be delivered with single EMM or multiple EMMs. The target receivers are broken into groups and each periodic key is associated with a group of the receivers. A receiver will belong to different groups at different times. In one example, each group is selected as being a group having an ID that falls within a range of ID values. In other example implementations, the group can be associated with, for example, tier or service, receiver model type, back channel availability, spot beam, DMA, serial number or address groupings. Other ways of grouping the devices will occur to those skilled in the art upon consideration of the present teachings. Devices can be grouped in different configurations for forensic purposes to narrow down the identity of the compromised receiver.

At each receiver, the ECM is processed wherein a periodic key associated with that receiver is used to derive or calculate the content key. The content key can be a result of one-way decryption functions that validates the periodic key and the relevant access criteria in the ECM. An IV is used as an initial value in the hashing process which can help guarantee a unique content key for each encryption by each periodic key. In this manner, each defined group is provisioned with one or more periodic keys and with a content key by providing EMM and ECM messages specific to the target group so that each group can access the content key using the periodic key and then proceed to decrypt the content.

As mentioned above, in a preferred embodiment, a single ECM can be decrypted by multiple periodic keys which can greatly reduce the number of ECM messages required to support a forensic key capability. The single ECM cannot typically be used to calculate or allow access to a shared content key used by multiple groups, but in the preferred embodiment, the content keys derived are different and applied to separate encryptions of the same content. Consequently, different periodic keys when processing the same ECM data will result in different content keys. This result allows for efficient delivery of ECMs.

In the event a compromised key is detected (in this example, either a content key or a periodic key), either can be traced to a group of receivers from which the key was determined. In the simple example of FIG. 2, there are only 16 groups provided. This means that the search for the pirate receiver is potentially narrowed by $16^{th}$ of the population of receivers (assuming equal population distribution of the groups). This is a first step toward isolating the pirate receiver, and recall that many more periodic keys can also be provided in order to reduce the population of potential pirates. However, note that the process can be readily iterated as follows.

Assume that the pirate device is determined to be within the population having periodic key 0 and content key 0. In this case, a new set of EMMs and ECMs can be generated in which the receivers outside the population using periodic key 0 and content key 0 can be aggregated into a single population of non-pirate receivers, and the potential pirate receivers can then be subdivided into subpopulations of devices and the process repeated. This process can continue until the pirate device is isolated by virtue of direct link to the decryption key tied to the pirate device. Of course, the search for the pirate device can be further narrowed by other forensic techniques too to speed up the process. Moreover, a very small population of potential pirate receiver devices can be targeted if there is suspicion that a particular one or more of the devices are the pirate device or devices.

Figure 3:
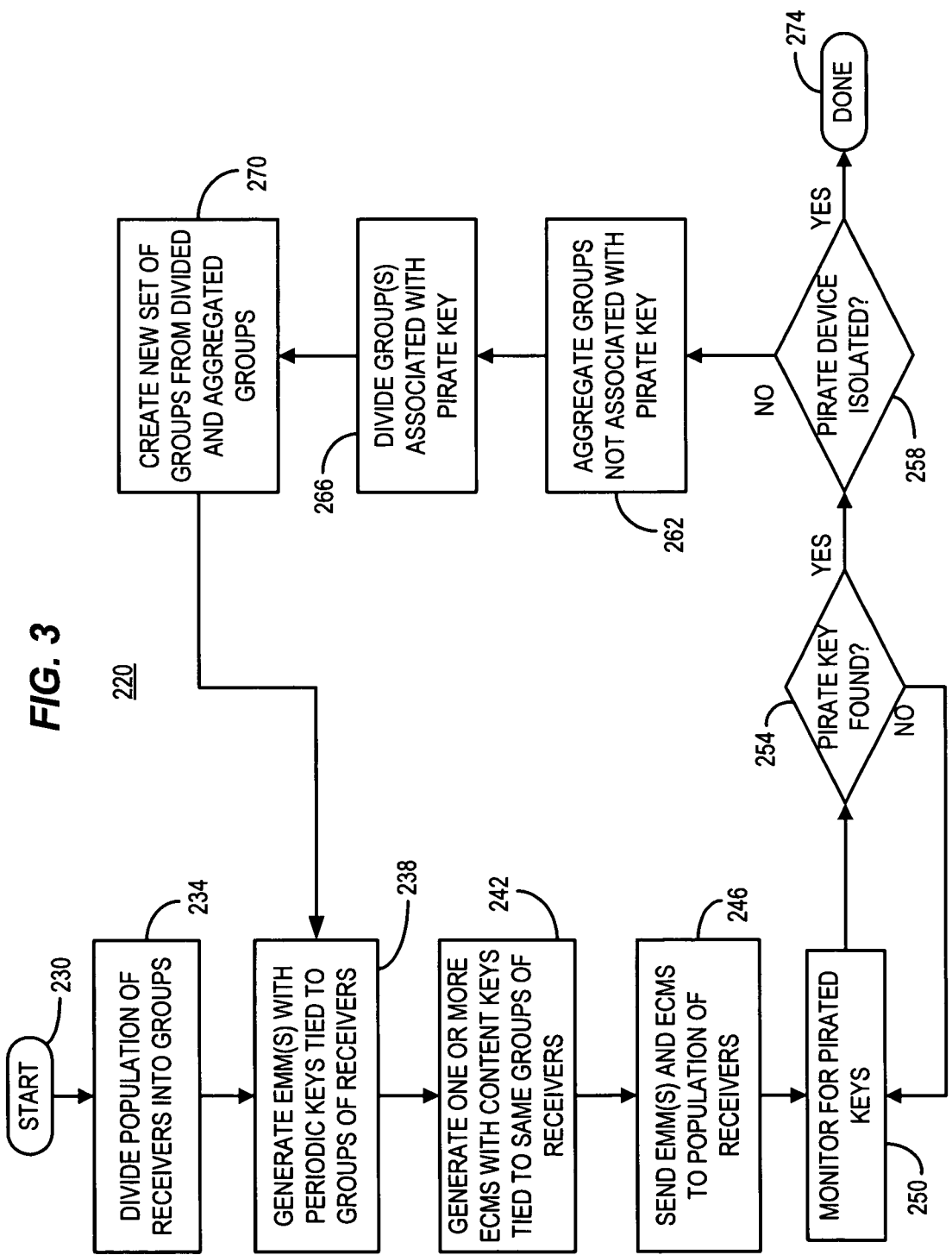
FIG. 3 is an illustrative example depicts an example process for iteratively isolating a pirate receiver device consistent with certain embodiments of the present invention.

FIG. 3 depicts an example of this process 220 for iteratively isolating a pirate receiver device as described above starting at 230. To simplify, this process assumes all actions are within the epoch of one periodic key. The process begins by dividing the population of possible receivers into N groups at 234. In the example above, N is 16, but any suitable number of groups can be used. At 238, N periodic keys are generated and packaged in one or more EMM messages that are used to communicate the N periodic keys to receiver devices. At 242, a corresponding N content keys are generated, each of which are associated with one of the N groups of receivers and one of the N periodic keys. The EMM(s) and EMC(s) can then be sent to the population of receivers at 246. If one of the groups of receivers contains a receiver that is used for pirating either of the keys, then by intercepting the key, the key can be traced to one of the N groups of receivers. Hence, at this point, the process involves monitoring for pirated keys at 250 (for example via the Internet) or testing a hacked receiver to see what keys it is responding to. The keys are distributed by the pirates can be either the periodic keys, program keys (if used) or the content keys.

The search for pirated keys continues until one is found at 254. At this point, the population of receivers that could potentially contain the pirate receiver is known. Unless the group is a group of one or is small enough that the pirate device can be isolated by other means at 258 the process proceeds to 262 where the groups that do not contain the pirated device are aggregated into a single group. The process then proceeds to 266 where the group containing the pirate receiver device from which the pirate keys came is divided into sub-groups and a new set of groups is formed from the aggregated group and the sub-groups. In the example above (assuming one group is associated with a pirate device), 15 sub-groups are added to the aggregated group and control passes to 238 where the process is iterated until such time as the pirate device is isolated at 258. At this point, the process ends at 274. It is noted that there need be no "knowledge" at the receiver side of any relationship between the content key and the periodic key. While there may be many thousands of receiver devices available that is to be divided into groups, by iteratively processing, the groups can be narrowed and this technique can be combined with other forensics to determine the identity of the pirate receiver device. Once identified, appropriate action can be taken including law enforcement action or deactivating the pirate receiver.

In certain example implementations, as mentioned earlier, the content can be encrypted using selective multiple encryption as described in U.S. Pat. No. 7,151,831 and its related patents which are hereby incorporated by reference, in which certain packets are deemed to be "critical" in the sense that without proper decryption and decoding of those packets, the resultant content will not produce a satisfying viewing experience. Those packets within an element of content such as a movie or television program are duplicated and each copy is encrypted with one of N encryption keys corresponding to the N content keys used for decryption. In this manner, the overhead of encryption using multiple keys is minimized. Overall security of the content can be further enhanced using a global coverage key that encrypts all of the content or all non-critical content. Many variations will occur to those skilled in the art upon consideration of the present teachings.

Figure 4:
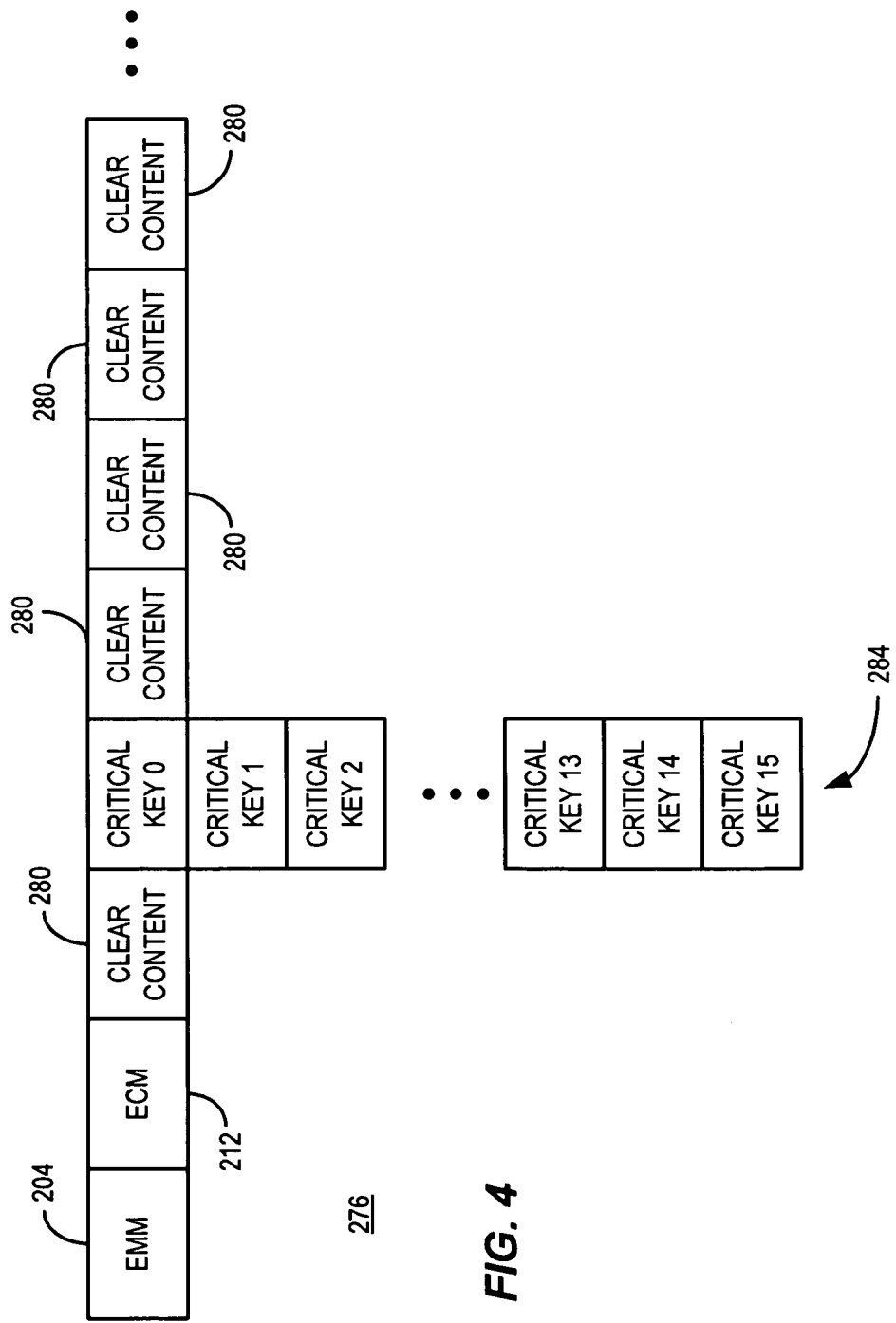
FIG. 4 depicts an example segment of a signal stream in which selective multiple encryption is utilized to deliver the content to a particular receiver consistent with certain embodiments of the present invention.

FIG. 4 depicts an example segment of a signal stream 276 in which selective multiple encryption is utilized to deliver the content to a particular receiver. In this example, one EMM message 204 is delivered to the receiver as well as an ECM message 212 to the receiver. This provides the receiver with a periodic key and a content key. Multiple selectively encrypted content is then provided in the form of a stream of content in which clear content packets 280, with multiple critical packets 284 being delivered with each copy encrypted under a different one of the content keys (sixteen in this example). Each encrypted copy 284 is provided with a packet identifier (PID) such that the target group of receivers can identify the copy 284 that is encrypted for its group, and thereby decrypt and decode the content. But, if the content keys, program keys, or periodic keys are redistributed by a hacker, the group to which the pirate decoder used in the hacking operation will be revealed and traced using the iterative process previously described.

Figure 5:
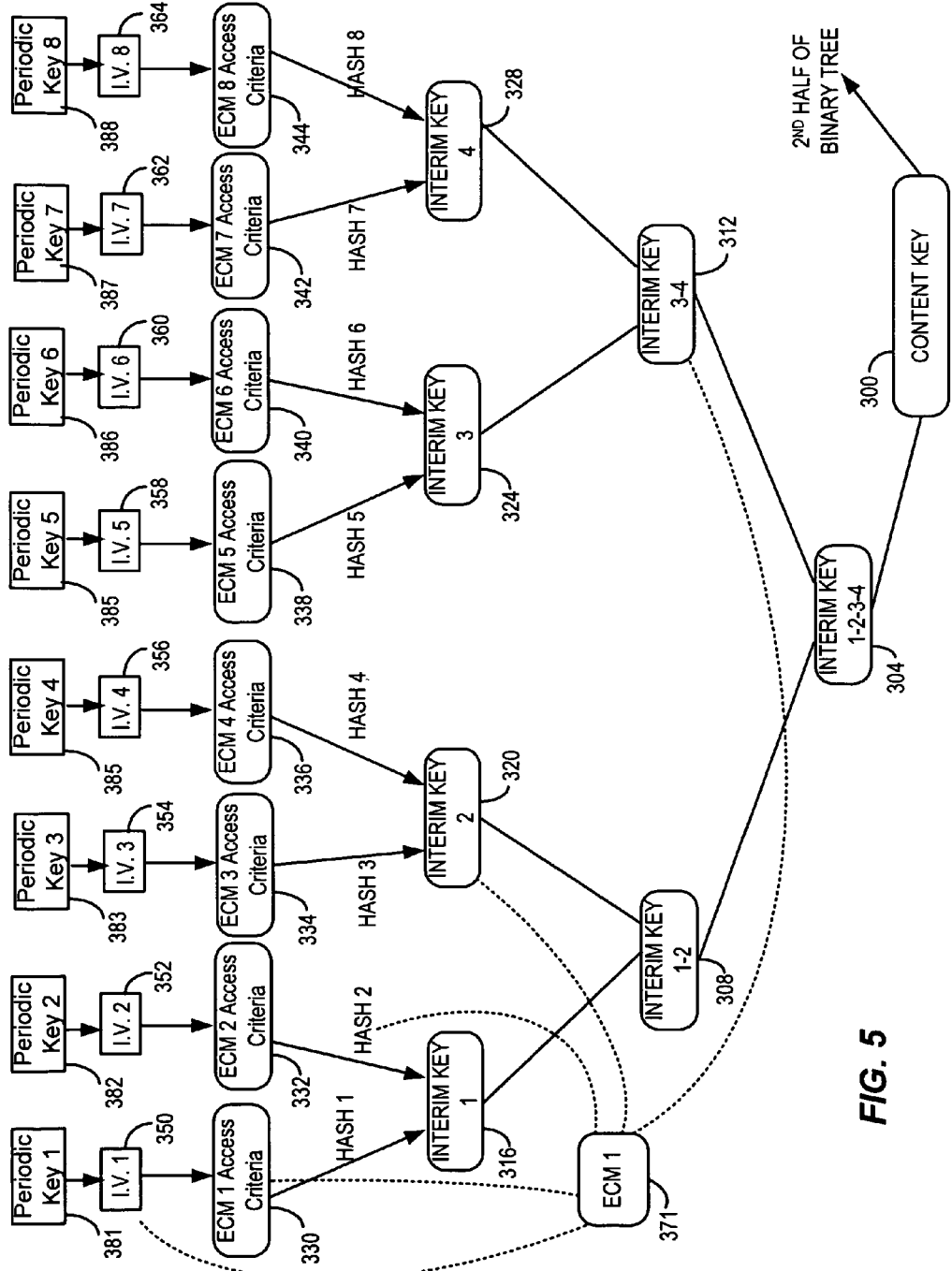
FIG. 5 is a diagram of an illustrative binary tree chaining process consistent with certain example embodiments of the present invention.

Now referring to FIG. 5, a technique is shown is called "binary tree chaining" in which the process discussed in FIG. 2 can be used to derive a common content key. This technique is useful when selective multiple encryption cannot be used or cannot be used for all group of receivers receiving periodic keys. In FIG. 5, 16 groups (only half is shown in the actual figure) having 16 periodic keys (half of the periodic keys 1-8 labeled 381-388) can derive a shared content key. 16 ECMs will be delivered. A hacked receiver with knowledge of one of the periodic keys will process just one of the ECM (1-16). Binary tree chaining can be used with selective multiple encryption where multiple content keys may be used. Pirate delivery of one of the shared content keys will difficult if not impossible to isolate from which periodic key (and group) the hacked decoder came from. But some systems may not be able to apply selective multiple encryption for one reason or another. Binary tree chaining can have many useful anti-piracy properties. Use of binary tree chaining prevents knowledge learned from one group to be used to spoof receivers in another group. For example, a hacker cannot re-encrypt the shared content key. It also makes it very difficult for a hacker who might have knowledge of a periodic key to re-encrypt ECMs with different access criteria in an attempt to re-use existing legitimate hardware from the service provider—something the pirate community calls "droning". Binary tree chaining allows all the access criteria of all the ECMs to be authenticated in the common content key derived. Changing the access criteria causes an improper key to be derived by the legitimate hardware.

In certain embodiments consistent with certain implementations of the invention the discovery of pirated content is of utmost importance both in terms of enforcement of ownership of content and in terms of minimizing economic loss. With regard to FIG. 5, a conditional access system may provide an ECM 1-16 that includes fields to make computation of the content key 300 more efficient. As an example, take ECM 1. ECM1 has the following fields: IV 350, Access Criteria 330, Hash 2, Interim Key 2, and Interim Key 3-4. All the fields may be encrypted with the possible exception of Access Criteria as any manipulation of the access criteria will cause a change in the resulting content key. IV 350 is encrypted using Periodic Key 1 381. The Hash 2 value may be encrypted using Hash 1 which the output of the processing of ECM 1 access criteria 330. The Interim Key 2 320 field may be encrypted using Interim Key 1 316 which will be derived from a hash of Hash 1 and Hash 2. The Interim Key 3-4 312 may be encrypted using Interim Key 1-2 308 which is a result of a hash of Interim Key 1 316 and Interim Key 3 324. The key processing shown in FIG. 5 provides a verifiable, forensic association between the Periodic Key 1 381 used to decrypt ECM 371 and the receiver to whom the ECM 371 is to be delivered and used. Block encryption such as that used to encrypt the IV (354, 356, 360, 362, 364) may use an encryption such as AES or a proprietary encryption scheme. Hashing may be accomplished using SHA-128 or SHA-256 or any other suitable hashing scheme. In this manner, all the access criteria of all of the ECMs can be authenticated in the content key 300 derived.

Figure 6:
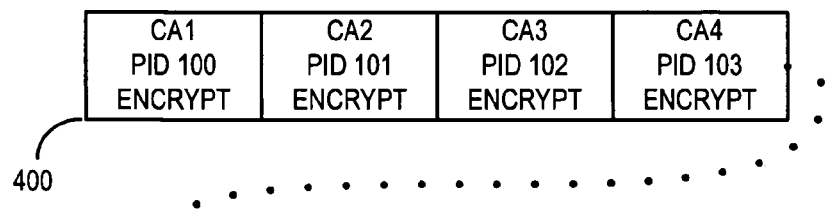
FIG. 6 depicts an example of creation of a selective multiple encryption event consistent with certain embodiments of the present invention.
Figure 6:
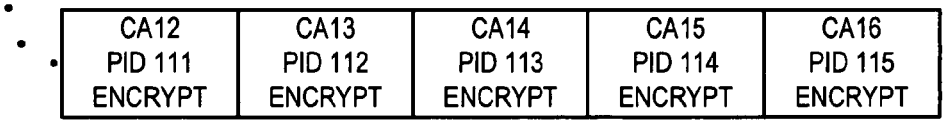

Turning now to FIG. 6, this is an exemplary view of the creation of a selective multiple encryption event 400, where up to 16 individual critical packets are encrypted with 16 different content keys. In an exemplary embodiment, each packet is separately encrypted. A receiver will only be enabled to decrypt one of the critical packets delivered. If a hacker receiver is obtained by law enforcement or the service provider, it can be determined which packet is being decrypted by systematically providing enabling one of the encrypted packets after another.

Figure 7:
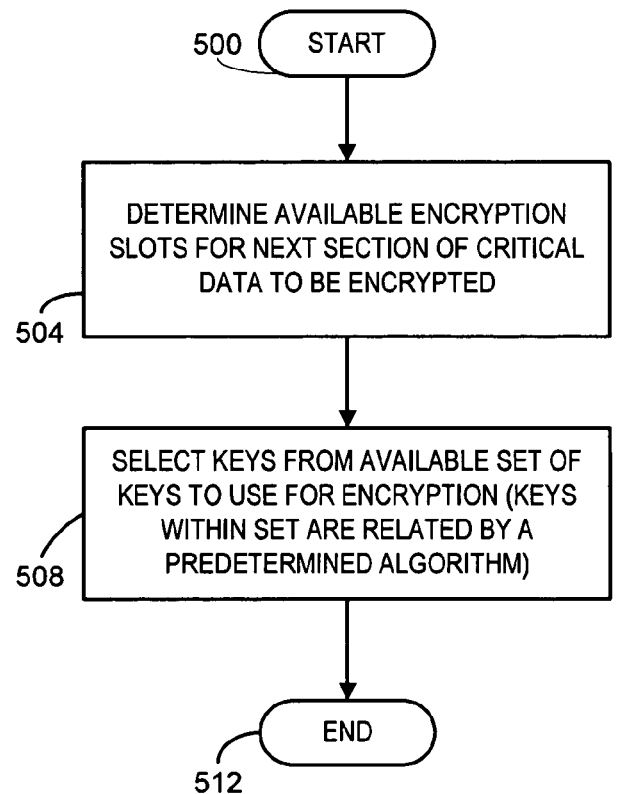
FIG. 7 depicts an illustrative process for determination of encryption slots and keys in a manner consistent with certain embodiments of the present invention.

Turning now to FIG. 7, starting at 500 for certain embodiments consistent with the invention determining the number of encryption slots and keys to use 504 for the multiple encryption of the critical packets is determined for the encryption of the next portion of critical data content 400 within the encrypted data stream. At 508, keys are selected from the available set of keys for use for encryption. Keys within the set are related by a predetermined algorithm. The process ends at 512.

Figure 8:
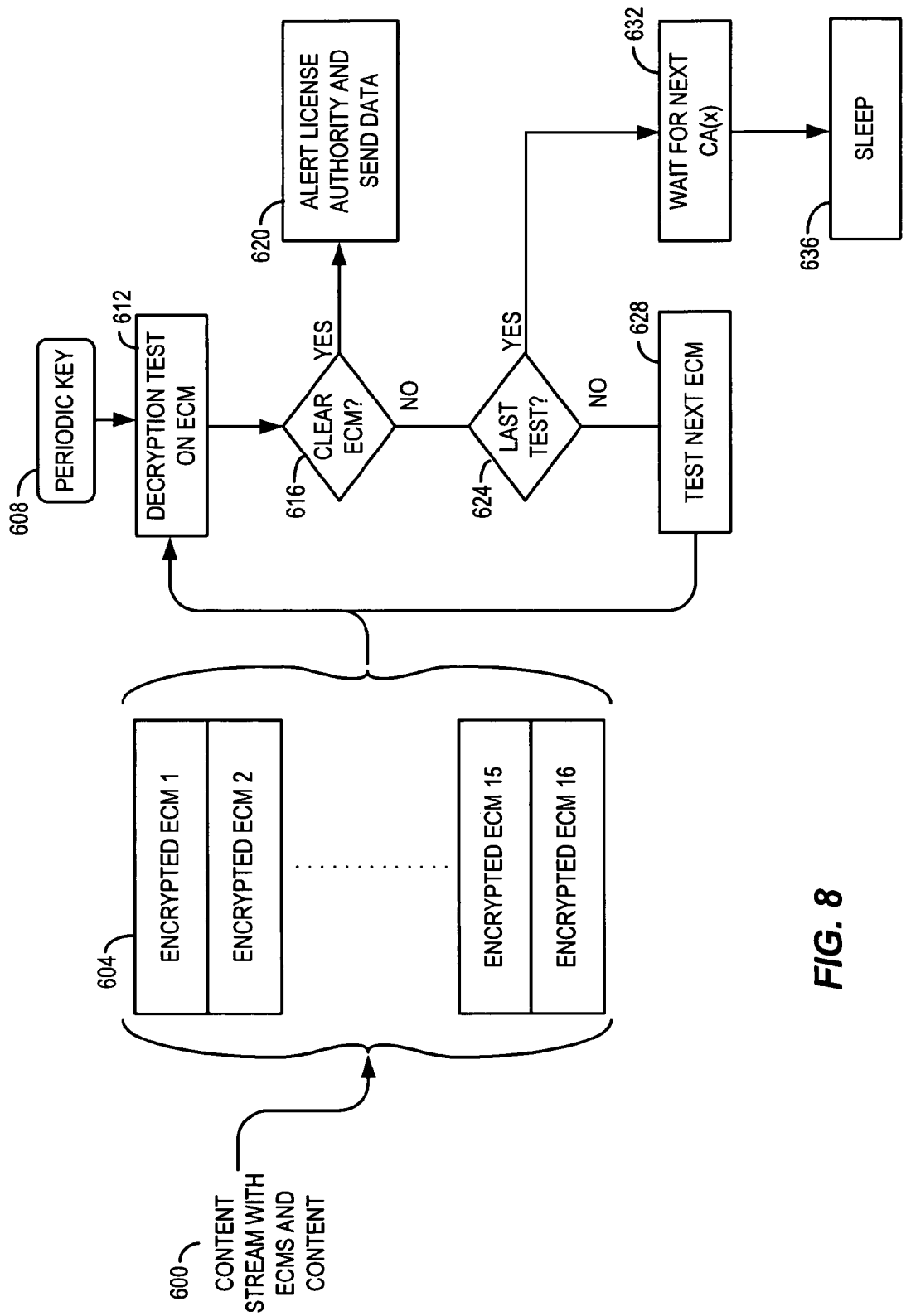
FIG. 8 shows an example process for testing a suspected pirate receiver in a manner consistent with certain implementations of the present invention.

Turning now to FIG. 8, for certain implementation consistent with the invention a stream 600 consisting of content and ECMs is transmitted to a receiver that is suspected of displaying pirated content. The stream 600 comprises 16 authenticated encryption key values associated with each ECM 604. The suspected pirate receiver, which, in an exemplary embodiment, may be procured by an agent of law enforcement or the service provider, contains one or more Periodic Keys 608 associated with a hacked identity. The receiver receives the content from the stream 600 and decrypts the appropriate ECM to receive the data stream. In the receiver under test, the content stream is received such that the authenticated encryption keys (encrypted ECMs) 604 may be tested one-by-one against the periodic key(s) 608 pre-loaded within the suspected pirate receiver. The decode logic within the receiver is operative to load an authenticated encryption key 604 and test the decryption of the key with one or more of the Periodic Keys 612. If the test produces a clear ECM an agent of law enforcement or the service provider is alerted. These data will be used to determine the identity of the receiver to whom the periodic keys were pre-loaded, or, in the case of the periodic key belonging to a group of receivers or where the single decoded authenticated encryption key is not enough to narrow the identity to a single receiver, will be used in further analysis of the data by the license authority to attempt to narrow the identity of the Periodic Key as much as possible. Additional content may be required to completely determine the identity of a receiver for the latter cases.

If the test 612 does not produce a clear ECM 616, the system continues to test each authenticated encryption key at 628 within stream until all 16 authenticated encryption keys have been tested at 624. If each test is unsuccessful, the system waits for the next stream which will contain another set of authenticated encryption keys 632 and sleeps in a sleep state at 636 until the newly delivered keys are received whereupon it will begin the testing of the newly delivered authenticated encryption keys. In another exemplary embodiment, multiple CA message packet deliveries may be used to test the receiver, with each CA message packet providing authenticated encryption keys representing broad groups of receivers first, and narrowing the groups with successive CA message packets until a receiver identity is discovered.

Figure 9:
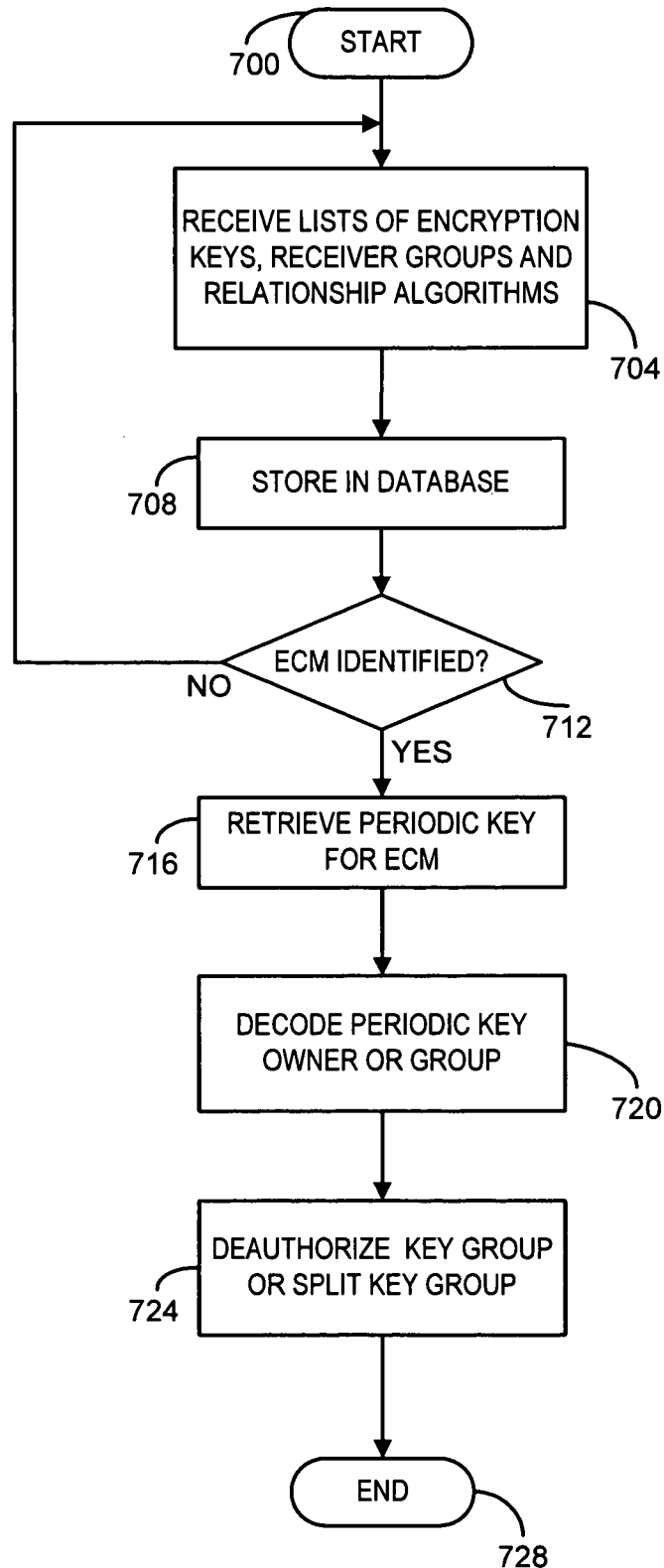
FIG. 9 depicts a process for revocation of a key group consistent with certain embodiments of the invention.

Turning now to FIG. 9, for certain embodiments of the invention a licensing authority provides for key management and key traceability for the system. The licensing authority (used synonymously with conditional access provider or license configuration authority) is usually (but not necessarily) a separate entity from the service provider that is used for tracking and enforcement of the encryption key sets as produced by use of the exemplary system. The license authority receives lists of the authenticated encryption keys, the receiver groups to whom the keys are referenced, and the relationship between the authenticated encryption keys and receiver groups 604. In an exemplary embodiment, the license authority would receive from service provider the list of authenticated encryption keys that are registered to this receiver, lists of receiver groups associated with sets of authenticated encryption keys, and the relationships between these data groups. In this fashion, the license authority and the service provider maintain a duplicate set of tracking information for encrypted content. This information is then saved in a secure database 708.

The license authority can be given the responsibility to peruse information sources such as the Web and Internet to determine if, and when, one or more periodic codes are offered to uses of pirate receivers. If abuse is not detected 712, the license authority continues to receive lists of encryption information 704 and store such in the secure database 708 as stated above. However, if abuse is detected 712, in the form of a publicly displayed set of periodic codes, the license authority receive all information regarding an authenticated encryption key and its associated ECM and retrieve information from the secure database to identify the periodic key 616 and search the lists to determine the receivers or groups of receivers that have been pre-loaded with the identified periodic key 720. If a large group of receivers has been associated with the particular periodic key, the license authority may use data-mining or other analysis techniques to narrow down the identity or location of the compromised receiver. If these techniques are successful and a particular receiver or group is isolated, the key group may be revoked 724 to disallow content to that particular receiver or group. This action provides for the shutdown of pirated receiver identities without affecting periodic keys that have been distributed to legitimate receivers or receiver groups.

In certain embodiments, this method and system is also highly efficient, causing minimal additional overhead in the encryption process, and is provided at the transport layer of network communication capability. There is also no need to insert control codes or additional file segments within encrypted content as the system and method provides for encryption using processes currently in place.

Further, in certain embodiments, encrypting each of said ECMs is performed using a unique initialization vector, where the said unique initialization vector comprises a random number. Hashing combinations of authenticated encryption keys is performed according to a binary tree structure where a CA packet comprises 16 authenticated encryption keys and a concatenation of CA packets comprises 16 CA packets for inclusion in the data content header file. Additionally, testing of authenticated encryption keys is performed in a receiver that is suspected of decoding content utilizing a periodic key that is not legally assigned to that receiver. A receiver to be used in testing of the authenticated encryption keys is procured for this purpose by an agent of a licensing authority. The testing of authenticated encrypted key may comprise multiple deliveries of data content comprising multiple CA packets, each packet of which is operative to eliminate receivers and groups of receivers such that each testing operation narrows down the field of receiver identities, and where the inclusion of the plurality of CA packets adds no more than approximately 3.5% additional data to the data content that is transmitted to a receiver.

In certain embodiments, a computer readable storage medium storing instructions for identifying the source of authenticated encryption keys, hashes combinations of authenticated encryption keys together to produce at least one combined conditional access (CA) packet. This method produces a plurality of CA packets and concatenates said plurality of CA packets for inclusion in a data content header file and delivers the data content header file to a plurality of individual receivers. The instructions are operative to select an individual receiver for use in testing to determine if authenticated encryption codes are decoded by said individual receiver. In addition, testing each authenticated encryption key in the selected individual receiver by unpacking each of the plurality of CA packets to reveal each authenticated encryption key in said packets and testing each authenticated encryption key by using each of a plurality of periodic keys pre-loaded within the individual receiver to determine if the authenticated encryption key is decoded by any of said periodic keys, and thereafter the decoded periodic key is reported to a license authority to determine the identity of the receiver or group of receivers.

In certain embodiments, a computer readable storage medium storing instructions for hashing is accomplished by a hash algorithm in general use in the industry and hashing combinations of authenticated encryption keys is performed according to a binary tree structure in which the CA packet comprises 16 authenticated encryption keys and a concatenation of CA packets comprises 16 CA packets for inclusion in a data content header file. The instructions include testing of authenticated encryption keys is performed in a receiver that is suspected of decoding content utilizing a periodic key that is not legally assigned to that receiver, where the receiver to be used in testing said authenticated encryption keys is procured for this purpose by an agent of a licensing authority. Instructions are also included for testing of authenticated encrypted key may comprise multiple deliveries of data content comprising multiple CA packets, each packet of which is operative to eliminate receivers and groups of receivers such that each testing operation narrows down the field of receiver identities, where the inclusion of the plurality of CA packets adds no more than approximately 3.5% additional data to the data content that is transmitted to a receiver.

In certain embodiments, a system for identifying the source of illegal video encryption codes using a transmitted data content stream includes a processor operative to encrypt a plurality of entitlement control messages (ECMs), a software module operative to hash each of the plurality of ECMs to produce an authenticated encryption key for each ECM, and hash combinations of the authenticated encryption keys together to produce at least one conditional access (CA) packet, a video content receiver operative to test received CA packets, in which the video content receiver pre-loaded with at least one periodic key for use in testing received CA packets. The system also includes a software module operative to test each authenticated encryption key in the video content receiver by unpacking each of the plurality of CA packets to reveal each authenticated encryption key in said packets and testing each authenticated encryption key by using at least one periodic key pre-loaded within the individual receiver to determine if the authenticated encryption key is decoded by said periodic key. The system creates a content decode report to send said decoding periodic key to a license authority to determine the identity of the receiver or group of receivers.

In certain embodiments, software module hashing is accomplished by a hash algorithm in general use in the industry. A software module hashes combinations of authenticated encryption keys according to a binary tree structure in which a CA packet comprises 16 authenticated encryption keys and a concatenation of CA packets comprises 16 CA packets for inclusion in said data content header file. A software module is provided for testing of authenticated encryption keys performed in a receiver that is suspected of decoding content utilizing a periodic key that is not legally assigned to that receiver, where the content receiver used is procured by an agent of a licensing authority. The software module provides further testing of authenticated encrypted keys that may comprise multiple deliveries of data content comprising multiple CA packets, each packet of which is operative to eliminate receivers and groups of receivers such that each testing operation narrows down the field of receiver identities. When testing identifies the receiver identity, the identified receiver periodic keys are revoked by the license authority.

Thus, in accord with certain example implementations, a method of identifying a receiver device from which pirated video decryption keys have been obtained involves organizing a population of receiver devices into a plurality of N groups; associating the N groups with a plurality of N decryption keys, where each of the N groups is associated with one of the N decryption keys; causing the plurality of N periodic keys and N content keys to be obtained by their associated N groups of receiver devices by direct delivery or by derivation at the receiver devices; encrypting a corresponding plurality of N entitlement control messages (ECMs) using the N periodic keys so as to produce N sequences of content keys respectively associated with the N groups. In certain embodiments, a pirated key can be identified as being associated with one of the N groups so as to identify the receiver device from which the pirated video decryption keys have been obtained as belonging to one of the N groups.

Another method of identifying a receiver device from which pirated video decryption keys have been obtained involves organizing a population of receiver devices into a plurality of N groups; associating the N groups with a plurality of N decryption keys, where each of the N groups is associated with one of the N decryption keys; causing the plurality of N decryption keys to be obtained by their associated N groups of receiver devices by direct delivery or by derivation at the receiver devices; and encrypting one or more entitlement control messages (ECMs) using the N periodic keys so as to produce N sequences of content keys respectively associated with the N groups in order to segregate the receiver devices by virtue of their use of multiple decryption keys to decrypt content.

In certain embodiments, the identified pirated key comprises a program key. In certain embodiments, the identified pirated key comprises a content key. In certain embodiments, the identified pirated key comprises one of N content keys which are used to decrypt selectively multiple encrypted content. In certain embodiments, the identified pirated key comprises one of N content keys which are calculated or derived from one of N periodic keys or N program keys. In certain embodiments, the identified pirated key comprises one of N program keys which are calculated or derived from N periodic keys. In certain embodiments, the method further involves testing of authenticated encryption keys in a receiver that is suspected of decoding content utilizing a periodic key that is not legally assigned to that receiver. In certain embodiments, the testing of authenticated encrypted key involves multiple deliveries of data content comprising multiple CA packets, each packet of which is operative to eliminate receivers and groups of receivers such that each testing operation narrows down the field of receiver identities. In certain embodiments, the inclusion of the plurality of CA packets adds no more than approximately 3.5% additional data to the data content that is transmitted to a receiver. In certain embodiments, the field of receiver identities is narrowed to a single receiver. In certain embodiments, the identified receiver is revoked by a license authority. In certain embodiments, a single ECM is decrypted by N periodic keys producing N sequences of content keys respectively associated with the N groups.

Another example method of identifying a receiver device from which pirated video decryption keys have been obtained involves organizing a population of receiver devices into a plurality of N groups; associating the N groups with a plurality of N decryption keys, where each of the N groups is associated with one of the N decryption keys; causing the plurality of N decryption keys to be obtained by their associated N groups of receiver devices by direct delivery or by derivation at the receiver devices; encrypting a corresponding plurality of N entitlement control messages (ECMs) using the N periodic keys so as to produce N sequences of content keys respectively associated with the N groups; identifying a pirated key as being associated with one of the N groups so as to identify the receiver device from which the pirated video decryption keys have been obtained as belonging to one of the N groups; and testing authenticated encryption keys in a receiver that is suspected of decoding content utilizing a periodic key that is not legally assigned to that receiver, wherein said testing of authenticated encrypted keys comprises delivering multiple sets of data content comprising multiple CA packets, each packet of which is operative to eliminate receivers and groups of receivers such that each testing operation narrows down the field of receiver identities.

In certain embodiments, the identified pirated key comprises a program key. In certain embodiments, the identified pirated key comprises a content key. In certain embodiments, the identified pirated key comprises one of N content keys which are used to decrypt selectively multiple encrypted content. In certain embodiments, the identified pirated key comprises one of N content keys which are calculated or derived from one of N periodic keys or N program keys. In certain embodiments, the identified pirated key comprises one of N program keys which are calculated or derived from N periodic keys. In certain embodiments, the inclusion of the plurality of CA packets adds no more than approximately 3.5% additional data to the data content that is transmitted to a receiver. In certain embodiments, the field of receiver identities is narrowed to a single receiver. In certain embodiments, the identified receiver is revoked by a license authority.

Another method of identifying a receiver device from which pirated video decryption keys have been obtained involves organizing a population of receiver devices into a plurality of N groups; associating the N groups with a plurality of N content keys that are derived from N periodic keys, where each of the N groups is associated with one of the N periodic keys and content keys; causing the plurality of N periodic keys and N content keys to be obtained by their associated N groups of receiver devices by direct delivery or by derivation at the receiver devices; encrypting one or more entitlement control messages (ECMs) using the N periodic keys so as to produce the N sequences of content keys respectively associated with the N groups; identifying a pirated key as being associated with one of the N groups so as to identify the receiver device from which the pirated video decryption keys have been obtained as belonging to one of the N groups; testing authenticated encryption keys in a receiver that is suspected of decoding content utilizing a periodic key that is not legally assigned to that receiver, wherein said testing of authenticated encrypted keys comprises delivering multiple sets of data content comprising multiple CA packets, each packet of which is operative to eliminate receivers and groups of receivers such that each testing operation narrows down the field of receiver identities to a single receiver identity; and revoking the identified receiver. In certain embodiments, the identified pirated key comprises one of N content keys which are used to decrypt selectively multiple encrypted content.

Another method of identifying a receiver device from which pirated video decryption keys have been obtained involves organizing a population of receiver devices into a plurality of N groups; associating the N groups with a plurality of N decryption keys, where each of the N groups is associated with one of the N decryption keys, where the N decryption keys are used for either decryption of content or decryption of other decryption keys; causing the plurality of N periodic keys and N content keys to be obtained by their associated N groups of receiver devices by direct delivery or by derivation at the receiver devices; and identifying a pirated key as being associated with one of the N groups so as to identify the receiver device from which the pirated video decryption keys have been obtained as belonging to one of the N groups.

In certain embodiments, the identified pirated key comprises one of a program key, a content key, or a periodic key. In certain embodiments, the identified pirated key comprises one of N keys which are used to decrypt selectively multiple encrypted content. In certain embodiments, the process further involves successively narrowing down the number of receivers in the N groups in order to identify a smaller group of receiver identities from which pirate decryption keys are obtained. In certain embodiments, at least one identified receiver is revoked by a license authority.

While certain illustrative embodiments have been described, it is evident that many alternatives, modifications, permutations and variations will become apparent to those skilled in the art in light of the foregoing description.

What is claimed is:

1. A method of identifying a receiver device from which pirated video decryption keys have been obtained, comprising:
   splitting a population of receiver devices into a compromised population and a non-compromised population N groups;
   detecting a pirated video decryption key in one or more of the N groups;
   aggregating the groups comprising those groups in which a pirated video decryption key was not detected into a non-compromised population group;
   isolating the non-compromised population group;
   organizing the compromised population of receiver devices into a plurality of N new groups, where one of the N new groups is the non-compromised population group and the remainder of the N new groups is the group or groups containing the pirated video decryption key divided into subgroups;
   associating the N new groups with a plurality of N decryption keys, where each of the N new groups is associated with one of a plurality of N decryption keys;
   causing the plurality of N decryption keys to be obtained by their associated N new groups of receiver devices by direct delivery or by derivation at the receiver devices; and
   encrypting one or more entitlement control messages (ECMs) using one of a plurality of N periodic keys so as to produce N sequences of content keys respectively associated with the N new groups in order to segregate the receiver devices by virtue of their use of multiple decryption keys to decrypt content.

2. The method according to claim 1, further comprising identifying a pirated key as being associated with one of the N new groups so as to identify the receiver device from which the pirated video decryption keys have been obtained as belonging to one of the N new groups.

3. The method according to claim 2, where the identified pirated key comprises a program key.

4. The method according to claim 2, where the identified pirated key comprises a content key.

5. The method according to claim 2, where the identified pirated key comprises one of N content keys which are used to decrypt selectively multiple encrypted content.

6. The method according to claim 2, where the identified pirated key comprises one of N content keys which are calculated or derived from one of N periodic keys or N program keys.

7. The method according to claim 2, where the identified pirated key comprises one of N program keys which are calculated or derived from N periodic keys.

8. The method according to claim 1, further comprising testing of authenticated encryption keys in a receiver that is suspected of decoding content utilizing a periodic key that is not legally assigned to that receiver.

9. The method according to claim 8, where said testing of authenticated encryption key comprises multiple deliveries of data content comprising multiple conditional access (CA) packets, each packet of which is operative to eliminate receivers and groups of receivers such that each testing operation narrows down the field of receiver identities.

10. The method according to claim 9, where the inclusion of the plurality of CA packets adds no more than approximately 3.5% additional data to the data content that is transmitted to a receiver.

11. The method according to claim 9, where the field of receiver identities is narrowed to a single receiver.

12. The method according to claim 10 where the identified receiver is revoked by a license authority.

13. The method according to claim 1, where a single ECM is decrypted by N periodic keys producing N sequences of content keys respectively associated with the N new groups.

14. A method of identifying a receiver device from which pirated video decryption keys have been obtained, comprising:
   splitting a population of receiver devices into N groups;
   detecting a pirated video decryption key in one or more of the N groups;
   aggregating the groups comprising those groups in which a pirated video decryption key was not detected into a non-compromised population group;
   isolating the non-compromised population group;
   organizing the compromised population of receiver devices into a plurality of N new groups, where one of the N new groups is the non-compromised population group and the remainder of the N new groups is the group or groups containing the pirated video decryption key divided into subgroups;

associating the N new groups with a plurality of N decryption keys, where each of the N new groups is associated with one of the N decryption keys;

causing the plurality of N decryption keys to be obtained by their associated N new groups of receiver devices by direct delivery or by derivation at the receiver devices;

encrypting one or more entitlement control messages (ECMs) using a plurality of N periodic keys so as to produce N sequences of content keys respectively associated with the N new groups;

identifying a pirated key as being associated with one of the N new groups so as to identify the receiver device from which the pirated video decryption keys have been obtained as belonging to one of the N new groups; and testing authenticated encryption keys in a receiver that is suspected of decoding content utilizing a periodic key that is not legally assigned to that receiver, where said testing of authenticated encrypted keys comprises delivering multiple sets of data content comprising multiple conditional access (CA) packets, each packet of which is operative to eliminate receivers and groups of receivers such that each testing operation narrows down the field of receiver identities.

15. The method according to claim 14, where the identified pirated key comprises a program key.

16. The method according to claim 14, where the identified pirated key comprises a content key.

17. The method according to claim 14, where the identified pirated key comprises one of N content keys which are used to decrypt selectively multiple encrypted content.

18. The method according to claim 14, where the identified pirated key comprises one of N content keys which are calculated or derived from one of N periodic keys or N program keys.

19. The method according to claim 14, where the identified pirated key comprises one of N program keys which are calculated or derived from N periodic keys.

20. The method according to claim 14, where the inclusion of the plurality of CA packets adds no more than approximately 3.5% additional data to the data content that is transmitted to a receiver.

21. The method according to claim 14, where the field of receiver identities is narrowed to a single receiver.

22. The method according to claim 14, where the identified receiver is revoked by a license authority.

23. The method according to claim 14, where a single ECM is decrypted by N periodic keys producing N sequences of content keys respectively associated with the N new groups.

24. A method of identifying a receiver device from which pirated video decryption keys have been obtained, comprising:

splitting a population of receiver devices into N groups;

detecting a pirated video decryption key in one or more of the N groups;

aggregating the groups comprising those groups in which a pirated video decryption key was not detected into a non-compromised population group;

isolating the non-compromised population group;

organizing the compromised population of receiver devices into a plurality of N new groups, where one of the N new groups is the non-compromised population group and the remainder of the N new groups is the group or groups containing the pirated video decryption key divided into subgroups;

associating the N new groups with a plurality of N content keys that are derived from N periodic keys, where each of the N new groups is associated with one of the N periodic keys and content keys;

causing the plurality of N periodic keys and N content keys to be obtained by their associated N new groups of receiver devices by direct delivery or by derivation at the receiver devices;

encrypting an entitlement control message (ECMs) using the N periodic keys so as to produce the N sequences of content keys respectively associated with the N new groups;

identifying a pirated key as being associated with one of the N new groups so as to identify the receiver device from which the pirated video decryption keys have been obtained as belonging to one of the N new groups;

testing authenticated encryption keys in a receiver that is suspected of decoding content utilizing a periodic key that is not legally assigned to that receiver, where said testing of authenticated encrypted keys comprises delivering multiple sets of data content comprising multiple CA packets, each packet of which is operative to eliminate receivers and groups of receivers such that each testing operation narrows down the field of receiver identities to a single receiver identity; and revoking the identified receiver.

25. The method according to claim 24, where the identified pirated key comprises one of N content keys which are used to decrypt selectively multiple encrypted content.

26. A method of identifying a receiver device from which pirated video decryption keys have been obtained, comprising:

splitting a population of receiver devices into N groups;

detecting a pirated video decryption key in one or more of the N groups;

aggregating the groups comprising those groups in which a pirated video decryption key was not detected into a non-compromised population group;

isolating the non-compromised population group;

organizing the compromised population of receiver devices into a plurality of N new groups, where one of the N new groups is the non-compromised population group and the remainder of the N new groups is the group or groups containing the pirated video decryption key divided into subgroups;

associating the N new groups with a plurality of N decryption keys, where each of the N new groups is associated with one of the N decryption keys, where the N decryption keys are used for either decryption of content or for decryption, calculation or derivation of other decryption keys;

causing the plurality of N periodic keys and N content keys to be obtained by their associated N groups of receiver devices by direct delivery or by derivation at the receiver devices;

encrypting one or more entitlement control messages (ECMs) using one of a plurality of N periodic keys so as to produce N sequences of content keys respectively associated with the N new groups in order to segregate the receiver devices by virtue of their use of multiple decryption keys to decrypt content; and identifying a pirated key as being associated with one of the N new groups so as to identify the receiver device from which the pirated video decryption keys have been obtained as belonging to one of the N new groups.

27. The method according to claim 26, where the identified pirated key comprises one of a program key, a content key, or a periodic key.

28. The method according to claim 26, where the identified pirated key comprises one of N keys which are used to decrypt selectively multiple encrypted content.

29. The method according to claim 26, further comprising successively narrowing down the number of receivers in the N new groups in order to identify a smaller group of receiver identities from which pirate decryption keys are obtained.

30. The method according to claim 26, where at least one identified receiver is revoked by a license authority.

* * * * *